(12) United States Patent
Tang

(10) Patent No.: US 9,793,728 B2
(45) Date of Patent: Oct. 17, 2017

(54) BATTERY DEVICE

(71) Applicant: ZEROTECH (Shenzhen) Intelligence Robot Co., Ltd., Shenzhen (CN)

(72) Inventor: Yaming Tang, Beijing (CN)

(73) Assignee: ZEROTECH (SHENZHEN) INTELLIGENCE ROBOT CO., LTD., Longgang District, Shenzhen (CN)

( * ) Notice: Subject to any disclaimer, the term of this patent is extended or adjusted under 35 U.S.C. 154(b) by 0 days.

(21) Appl. No.: 15/239,841

(22) Filed: Aug. 18, 2016

(65) Prior Publication Data
US 2017/0054314 A1    Feb. 23, 2017

(30) Foreign Application Priority Data
Aug. 21, 2015   (CN) .................... 2015 2 0633899 U

(51) Int. Cl.
*H02J 7/00*    (2006.01)
*B64C 39/02*   (2006.01)
*B60L 11/18*   (2006.01)

(52) U.S. Cl.
CPC ......... *H02J 7/0045* (2013.01); *B60L 11/1879* (2013.01); *B64C 39/024* (2013.01); *B60L 2200/10* (2013.01)

(58) Field of Classification Search
CPC ...................................................... H02J 7/0045
USPC ......................................................... 320/112
See application file for complete search history.

(56) References Cited

U.S. PATENT DOCUMENTS

| 8,614,016 | B2 * | 12/2013 | Yusa ....................... H01M 2/06 429/99 |
| 9,056,676 | B1 * | 6/2015 | Wang ........................ B64F 1/00 |
| 9,660,229 | B2 * | 5/2017 | Chellew .................... B25F 5/00 |
| 2008/0305390 | A1 * | 12/2008 | Naito .................... H01M 2/105 429/159 |

\* cited by examiner

*Primary Examiner* — Richard V Muralidar
(74) *Attorney, Agent, or Firm* — Jun He Law Offices P.C.; James J. Zhu

(57) ABSTRACT

A battery device comprises a housing, an electric core assembly enclosed within the housing, a control circuit board electrically coupled to the electric core assembly and for generating at least one battery parameter indicative of an operation status of the electric core assembly, and a connection port disposed on a front wall of the housing. The connection port comprises a set of power pins coupled to the electric core assembly and for charging or discharging the electric core assembly; and a set of data connection pins coupled to the control circuit board and for outputting the at least one battery parameter from the control circuit board.

20 Claims, 3 Drawing Sheets

BATTERY DEVICE

CROSS REFERENCE TO RELATED APPLICATIONS

This application claims priority to Chinese Patent Application No. 201520633899.0 filed on Aug. 21, 2015, the entire content of which is incorporated herein by reference.

TECHNICAL FIELD

The present application relates to battery devices, and more particularly to battery devices for use with unmanned aerial vehicles (UAVs).

BACKGROUND

An unmanned aerial vehicle (UAV) generally carries one or more batteries to provide power to various types of components thereof. The conventional batteries generally have two separate ports for power supply and data connection, respectively. However, the separate ports of the conventional batteries make the battery structure complicated, and thus it is inconvenient to attach such batteries to UAVs or remove them from the UAVs.

SUMMARY

An objective of the present application is to provide a battery device which is compact in structure and can be used in UAVs.

In a first aspect of the present application, there is disclosed a battery device. The battery device comprises a housing, an electric core assembly enclosed within the housing, a control circuit board electrically coupled to the electric core assembly and for generating at least one battery parameter indicative of an operation status of the electric core assembly, and a connection port disposed on a front wall of the housing. The connection port comprises a set of power pins coupled to the electric core assembly and for charging or discharging the electric core assembly; and a set of data connection pins coupled to the control circuit board and for outputting the at least one battery parameter from the control circuit board.

In a second aspect of the present application, there is disclosed a payload platform comprising the battery device of the first aspect. The payload platform may be a handheld payload platform or a UAV-carried payload platform.

In a third aspect of the present application, there is disclosed a UAV comprising the battery device of the first aspect.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
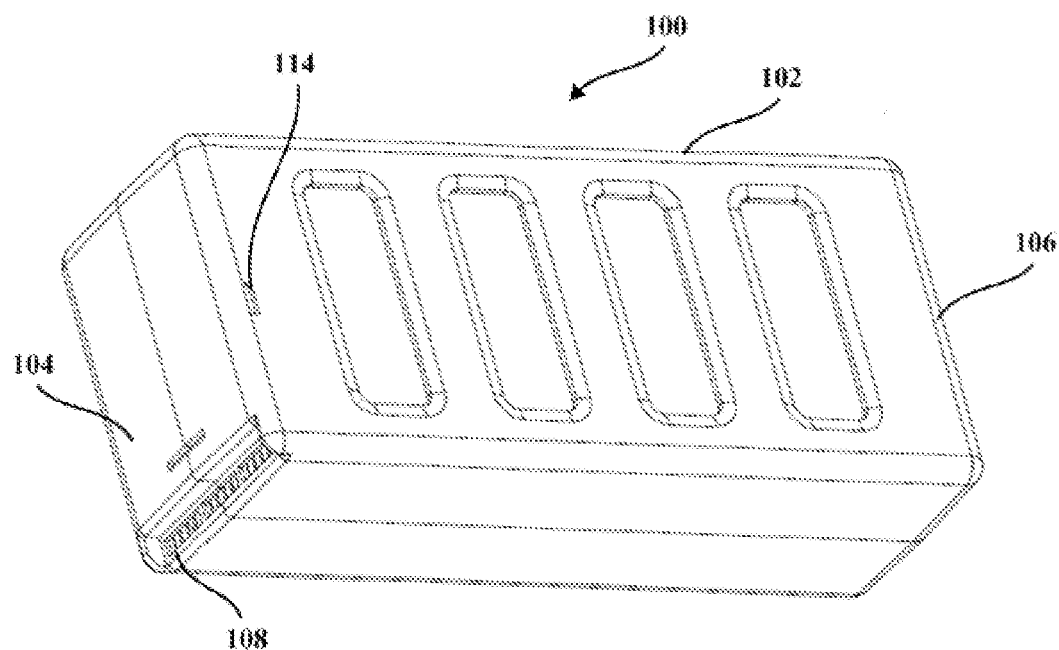
FIG. 1 shows a perspective view of a battery device 100 according to an embodiment of the present application.
Figure 2:
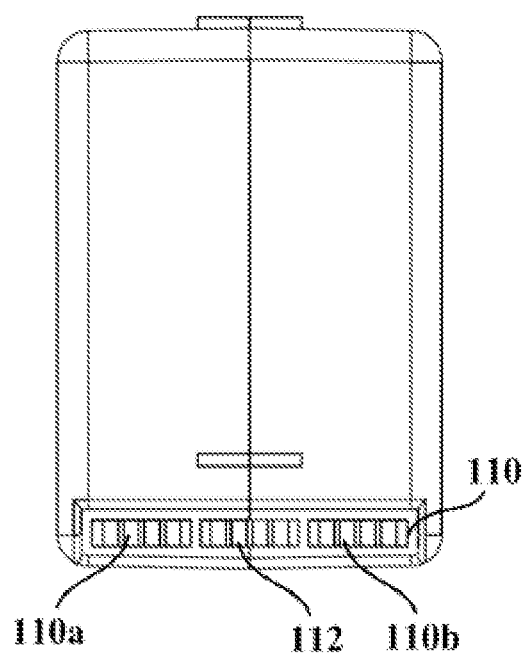
FIG. 2 shows a front view of the battery device 100.
Figure 3:
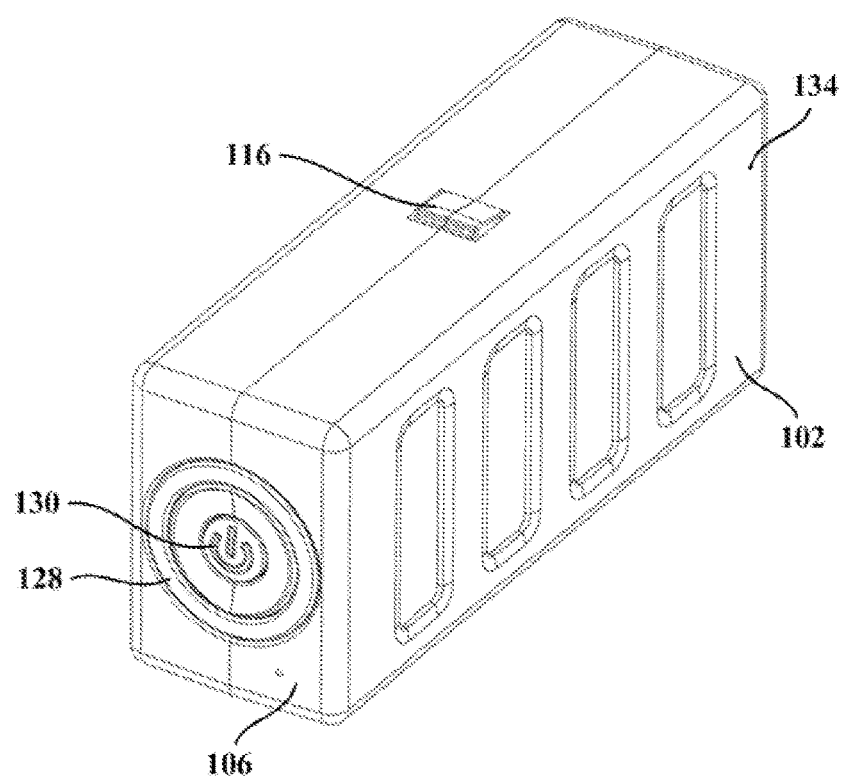
FIG. 3 shows a perspective view of the battery device 100 from its rear side.
Figure 4:
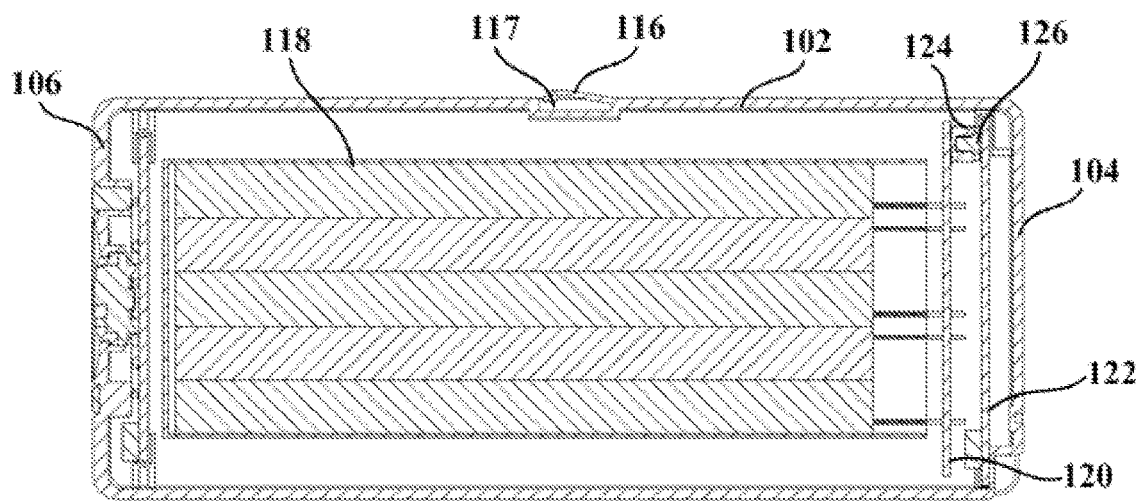
FIG. 4 shows a cross-sectional view of the battery device 100.
Figure 5:
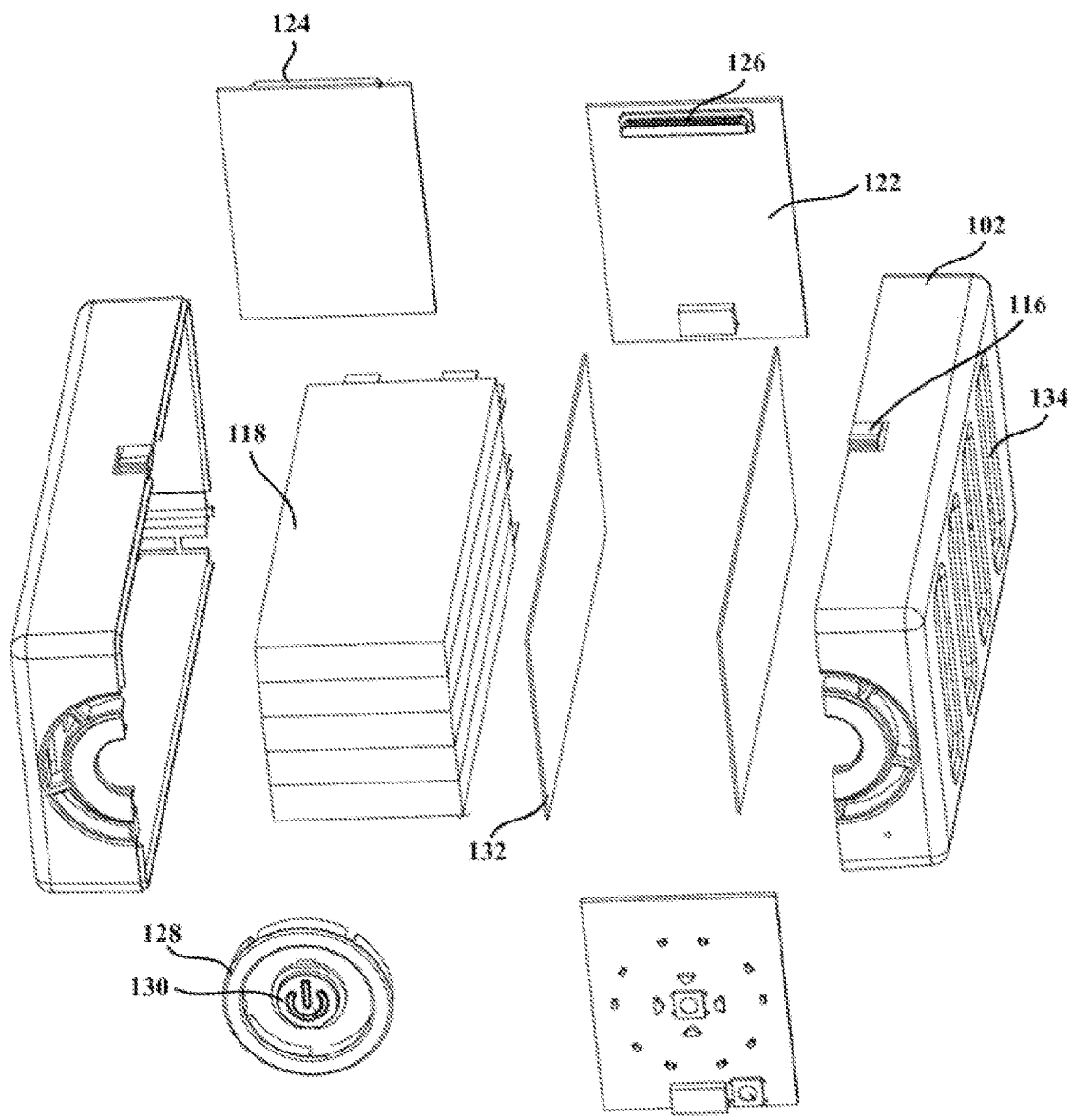
FIG. 5 shows an exploded view of the battery device 100.

FIGS. 1-5 show an exemplary battery device 100 according to an embodiment of the present application from various views of the battery device 100. Specifically, FIG. 1 shows a perspective view of the battery device 100. FIG. 2 shows a front view of the battery device 100. FIG. 3 shows a perspective view of the battery device 100 from its rear side. FIG. 4 shows a cross-sectional view of the battery device 100. FIG. 5 shows an exploded view of the battery device 100.

As shown in FIGS. 1-2, the battery device 100 includes a housing 102 which is of a substantially cuboid shape and defines an inner space. The housing 102 has a front wall 104 and a back wall 106 opposite to the front wall 104. A connection port 108 is disposed on the front wall 104, for example, at or near a bottom edge of the front wall 104. Alternatively, the connection port 108 may be disposed at some other position of the front wall 104, for example, at a center of the front wall 104, at an upper section of the front wall 104, at a lower section of the front wall 104, or at a lateral edge of the front wall 104.

The connection port 108 includes a set of power pins 110 and a set of data connection pins 112. The set of power pins 110 is used for charging and discharging of the battery device 100, while the set of data connection pins 112 is used for data and/or signal transmission between the battery device 100 and an electronic device to which the battery device 100 is connected.

In the embodiment shown in FIG. 2, the power pins 110 and the data connection pins 112 are arranged in a linear array. In some examples, the power pins 110 and the data connection pins 112 can be formed and function as a single unit, so as to facilitate the connection and disconnection of the battery device 100. In some alternative examples, the set of power pins 110 and the set of data connection pins 112 may be formed in a way to enable them to work individually and separately. For example, the set of power pins may be used to connect with a first connector of an electronic device, and the set of data connection pins may be used to connect with a second connector of the electronic device.

As shown in FIG. 2, the data connection pins 112 are disposed at a center of the linear array, and the power pins 110 are disposed at two ends of the linear array. Specifically, the power pins 110 may include two or more power pins, with one or more positive pins 110a at a left end of the linear array and one or more negative pins 110b at a right end of the linear array. In the embodiment shown in FIG. 2, the power pins 110 include four negative pins and four positive pins. As being separated by the data connection pins 112, a possibility of short-circuiting of the power pins 110 can be reduced, thereby improving the safety of using the battery device 100.

The data connection pins and the power pins of the connection port 108 may be arranged in a manner different from the arrangement shown in FIG. 2. In some embodiments, the power pins may be disposed at a center of the linear array, and the data connection pins may be disposed at one or two ends of the linear array. For example, eight power pins may be disposed at the center of the linear array, and one or more data connection pins may be disposed at the left end and the right end of the linear array, respectively. Alternatively, the data connection pins and the power pins may be arranged in a two-row array. For example, the data connection pins may be disposed in a first row of the two-row array and the power pins may be disposed in a second row of the two-row array.

As mentioned above, the set of data connection pins 112 can be used to transmit data and/or signal. In some embodiments, the set of data connection pins 112 may be in compliance with Serial Peripheral Interface (SPI) standard. Specifically, the set of data connection pins 112 may include four pins, which are used for data input, data output, clock, and chip select, respectively. It would be readily appreciated that the set of data connection pins 112 may be in compliance with any other suitable data transition protocol or standards.

In some embodiments, the set of power pins 110 and the set of data connection pins 112 may be contact pins, which is convenient to be connected to an electronic device or removed from the electronic device. In some other embodiments, the connection port 108 may be connected to an electronic device through interference fit.

In order for easy connection or disconnection (plug-in/plug-out) of the battery device 100, some special features may be incorporated into the battery device 100. As shown in FIG. 1, one or two positioning protrusions 114 may be disposed at one or more of side walls of the housing 102, which are perpendicular to the front wall 104 where the connection port 108 is disposed. The positioning protrusions 114 are close to the front wall 104. When the battery device 100 is connected to a recharger seat for recharging, the positioning protrusions 114 can be aligned to a corresponding structure (e.g. a positioning recess) of the recharger seat, so as to facilitate connecting the battery device 100 with the recharger seat.

Moreover, as shown in FIG. 3, one or more handles 116 can extend from one or more side walls of the housing 102 perpendicular to the front wall 104. The handles 116 may be used for connection of the battery device 100 with an electronic device. For example, when the battery device 100 is inserted into a battery slot of the electronic device, the handle 116 may be aligned with and received within a through-hole on a side wall of the battery slot, such that the battery device 100 can be firmly connected with the electronic device. Moreover, when the battery device 100 is to be moved out of the battery slot, the operator can push the handle 116 towards the housing 102 through the through-hole, such that the handle 116 will disconnect the battery device 100 from the electronic device. In some embodiments, the handles 116 may be made of a resilient material such as plastics or rubber.

Preferably, as shown in FIG. 4, a cavity 117 may be disposed below the handle 116 to receive it when the battery device 100 is connected to the electronic device.

FIGS. 4 and 5 show an internal structure of the battery device 100. As shown in FIGS. 4 and 5, the battery device 100 has an electric core assembly 118 enclosed within the housing 102. The electric core assembly 118 may include one or more electric core components which are stacked together. The electric core components can be coupled either in series or in parallel to form the electric core assembly 118 with a desired output voltage and/or capacity. In the embodiment, electrodes of the electric core components are coupled together by an electric core connection circuit board 120. For example, the electrodes of the electric core components may be welded or bonded to respective pads (not shown) on the electric core connection circuit board 120 where a connection circuit (not shown) may further connects these pads as desired.

The battery device 100 further includes a control circuit board 122, which is enclosed within the housing 102 as well. The control circuit board 122 may be electrically coupled to the electric core assembly 118 either directly or indirectly. In the embodiment, the control circuit board 122 is coupled to the electric core assembly 118 via the electric core connection circuit board 120. Specifically, the electric core connection circuit board 120 has a first connection unit 124 and the control circuit board 122 has a second connection unit 126. The first and second connection units 124 and 126 are matable with each other in structure and can be electrically coupled together, such that the pads, as well as the electrodes of the electric core assembly 118 coupled to the pads, can be electrically coupled to the control circuit board 122. The control circuit board 122 may further include connection wires coupling the second connection unit 126 to the connection port 108. In this way, both the electric core assembly 118 and the control circuit board 122 can be coupled to the connection port 108. For example, the electric core assembly 118 may be coupled to the set of power pins 110, while circuit components of the control circuit board 122 can be coupled to the set of data connection pins 112.

The control circuit board 122 may collect information regarding the electric core assembly 118 of the battery device 100, e.g., when the battery device 100 is in-use or not, and control the operation of the battery device 100. In some embodiments, the circuit components of the control circuit board 122 may include a measurement unit and a processor.

The measurement unit may be used to detect an operation status of the electric core assembly 118 using any known technologies, and generate one or more corresponding electrical signals indicative of the operation status, such as voltage, current and/or remaining capacity of the electric core assembly 118. The processor may further process the generated electrical signals and convert them into at least one battery parameter indicative of the operation status of the electric core assembly 118. The battery parameter(s) can be transmitted to the set of data connection pins 112.

In some embodiments, the control circuit board 122 may further include a battery protection unit, a charging unit, a voltage stabilization unit or other suitable circuit components. These circuit components can operate under the control of the processor.

By incorporating data connection pins and battery monitoring modules into the battery, it provides a customized battery for UAV or similar electronic devices. The data connection pins 112 may provide status of the battery device to the UAV, and help the operator of UAV to monitor the status of battery. For example, the operator of UAV may directly check the battery status through a software application used for controlling the UAV via a remote control terminal (e.g., a smart phone). While the UAV is flying in the air, the software application may send the operator any alert signals in case the battery device is low or malfunctions. For example, when the remaining capacity of the battery device is low, the UAV may automatically switch into a power-save mode. As it is critically important for UAV operators to have the real-time data of battery status, the present invention improves both the safety and performance of UAV.

As shown in FIG. 4, the electric core connection circuit board 120 and the control circuit board 122 may be disposed at the front of the inner space within the housing 102 and close to the connection port 108. These boards 120 and 122 may substantially overlay with each other to reduce occupation of the inner space, thereby making the battery device 100 compact in structure. Moreover, an indicator 128, such as a LED indicator, may be disposed at the back wall 106 of the housing 102. The indicator 128 may be electrically coupled to the control circuit board 122 to receive a battery parameter indicative of remaining capacity of the electric core assembly 118. The indicator 128 may further generate visual notifications to indicate the remaining capacity of the electric core assembly 118. As the indicator 128 is positioned opposite to the connection port, such that an operator can see the visual notifications from the indicator 128. Furthermore, a button 130 for turning on or off the battery device 100 may be disposed at the back wall 106. The button 130 can be coupled to the control circuit board 122. In some embodiments, a cover may be disposed above the button 130 to avoid mis-operation to the button 130.

As the battery device 100 is compact in structure, heat dissipation is an important factor for ensuring functionality and safety of the battery device 100. In some embodiments as shown in FIG. 5, one or two heat-dissipation boards (e.g. metal boards) 132 are disposed between the electric core assembly 118 and the side walls of the housing 102. Moreover, heat-dissipation holes 134 may be formed on the side walls to improve heat dissipation performance of the battery device 100.

Because of the compact structure and simplified connection port, the battery device of the present application can be used in various electronic devices which have high requirement on power supplies. For example, the battery device of the present application can be used in payload platforms such as UAV-carried payload platforms or handheld payload platforms. In some other examples, the battery device of the present application can also be used in UAVs with or without a payload platform.

Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A battery device, comprising:
   a housing;
   an electric core assembly enclosed within the housing;
   a control circuit board electrically coupled to the electric core assembly and for generating at least one battery parameter indicative of an operation status of the electric core assembly;
   a connection port disposed on a front wall of the housing, wherein the connection port comprises:
      a set of power pins coupled to the electric core assembly and for charging or discharging the electric core assembly; and
      a set of data connection pins coupled to the control circuit board and for outputting the at least one battery parameter from the control circuit board; and
   a handle extending from a side wall of the housing perpendicular to the front wall where the connection port is disposed, wherein the side wall of the housing further defines a cavity below the handle to receive the handle when the battery device is connected to an electronic device, and the handle is out of the cavity when the battery device is not connected to the electronic device.

2. The battery device of claim 1, wherein the set of power pins and the set of data connection pins are arranged in a linear array.

3. The battery device of claim 2, wherein the set of power pins and the set of data connection pins of the connection port are formed and function as a single unit.

4. The battery device of claim 2, wherein the set of power pins and the set of data connection pins of the connection port are formed in such a way that the set of data connection pins of the connection port can be used separately.

5. The battery device of claim 2, wherein the set of data connection pins are disposed at a center of the linear array, and the set of power pins are disposed at two ends of the linear array.

6. The battery device of claim 5, wherein the set of power pins comprise one or more positive pins and one or more negative pins which are separated by the set of data connection pins.

7. The battery device of claim 6, wherein the set of power pins comprise four positive pins and four negative pins that are separated by the set of data connection pins.

8. The battery device of claim 2, wherein the set of power pins are disposed at a center of the linear array, and the set of data connection pins are disposed at two ends of the linear array.

9. The battery device of claim 1, wherein the housing comprises at least one positioning protrusion at one or more of side walls of the housing perpendicular to the front wall where the connection port is disposed.

10. The battery device of claim 1, further comprising:
    an electric core connection circuit board for coupling electric cores of the electric core assembly, and coupling the electric core assembly to the set of power pins.

11. The battery device of claim 10, wherein
    the electric core connection circuit board comprises pads for electrically coupling electrodes of the electric core assembly and a first connection unit, and the control circuit board comprises a second connection unit matably and electrically coupled with the first connection unit, such that the pads can be electrically coupled to the set of power pins through the control circuit board.

12. The battery device of claim 10, wherein the electric core connection circuit board and the control circuit board are disposed at the front of an inner space within the housing and close to the connection port.

13. The battery device of claim 10, wherein the electric core connection circuit board and the control circuit board substantially overlay with each other.

14. The battery device of claim 1, further comprising:
a handle extending from a side wall of the housing perpendicular to the front wall where the connection port is disposed, and wherein the handle is made of a resilient material.

15. The battery device of claim 14, wherein the side wall of the housing further comprises a cavity below the handle.

16. The battery device of claim 1, further comprising a button coupled to the control circuit board and configured for turning on or off the battery device, wherein the button is disposed at a back wall of the housing opposite to the front wall.

17. The battery device of claim 1, further comprising an indicator for indicating remaining capacity of the electric core assembly, wherein the indicator is disposed at a back wall of the housing opposite to the front wall.

18. The battery device of claim 1, further comprising: at least one heat-dissipation board disposed between the electric core assembly and at least one side wall of the housing.

19. A payload platform comprising a battery device, wherein the battery device comprises:
a housing;
an electric core assembly enclosed within the housing;
a control circuit board electrically coupled to the electric core assembly and for generating at least one battery parameter indicative of an operation status of the electric core assembly;
a connection port disposed on a front wall of the housing, wherein the connection port comprises:
a set of power pins coupled to the electric core assembly and for charging or discharging the electric core assembly; and
a set of data connection pins coupled to the control circuit board and for outputting the at least one battery parameter from the control circuit board;
and wherein the battery device further comprises:
a handle extending from a side wall of the housing perpendicular to the front wall where the connection port is disposed, wherein the side wall of the housing further defines a cavity below the handle to receive the handle when the battery device is connected to an electronic device, and the handle is out of the cavity when the battery device is not connected to the electronic device.

20. An unmanned aerial vehicle comprising
a battery device, wherein the battery device comprises:
a housing;
an electric core assembly enclosed within the housing;
a control circuit board electrically coupled to the electric core assembly and for generating at least one battery parameter indicative of an operation status of the electric core assembly;
a connection port disposed on a front wall of the housing, wherein the connection port comprises:
a set of power pins coupled to the electric core assembly and for charging or discharging the electric core assembly; and
a set of data connection pins coupled to the control circuit board and for outputting the at least one a battery parameter from the control circuit board; and
a handle extending from a side wall of the housing perpendicular to the front wall where the connection port is disposed, wherein the side wall of the housing further defines a cavity below the handle to receive the handle when the battery device is connected to an electronic device, and the handle is out of the cavity when the battery device is not connected to the electronic device.

* * * * *